(12) United States Patent
Sei et al.

(10) Patent No.: US 9,061,620 B2
(45) Date of Patent: Jun. 23, 2015

(54) VEHICLE SEAT

(75) Inventors: Kousuke Sei, Toyota (JP); Keisuke Yamamoto, Toyota (JP); Yukinori Sugiura, Nissin (JP); Takanori Kinoshita, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 262 days.

(21) Appl. No.: 13/564,120

(22) Filed: Aug. 1, 2012

(65) Prior Publication Data

US 2013/0033080 A1 Feb. 7, 2013

(30) Foreign Application Priority Data

Aug. 4, 2011 (JP) .................................. 2011-170841

(51) Int. Cl.
| | |
|---|---|
| *B60N 2/22* | (2006.01) |
| *B60N 2/20* | (2006.01) |
| *B60N 2/68* | (2006.01) |
| *B60N 2/70* | (2006.01) |
| *B60N 2/36* | (2006.01) |

(52) U.S. Cl.
CPC ................ *B60N 2/68* (2013.01); *B60N 2/7005* (2013.01); *B60N 2/366* (2013.01)

(58) Field of Classification Search
CPC ......... B60N 2/366; B60N 2/68; B60N 2/7005
USPC ............. 297/353, 378.12, 378.13; 296/65.16, 296/65.17
See application file for complete search history.

(56) References Cited

U.S. PATENT DOCUMENTS

| | | | | |
|---|---|---|---|---|
| 5,664,839 | A * | 9/1997 | Pedronno et al. | 297/378.13 |
| 6,312,055 | B1 * | 11/2001 | Uematsu | 297/378.13 |
| 7,152,926 | B2 * | 12/2006 | Wrobel | 297/378.13 |
| 7,740,317 | B2 * | 6/2010 | Yamada et al. | 297/378.13 |
| 7,931,338 | B2 * | 4/2011 | Lindsay | 297/378.13 |
| 8,047,584 | B2 * | 11/2011 | Rock | 292/340 |
| 8,251,429 | B2 * | 8/2012 | Lindsay et al. | 296/65.16 |
| 8,353,552 | B2 * | 1/2013 | Scheurer et al. | 296/65.16 |

FOREIGN PATENT DOCUMENTS

| | | | |
|---|---|---|---|
| EP | 269348 A2 * | 6/1988 | |
| JP | 60-054443 | 4/1985 | |
| JP | 04-084061 | 7/1992 | |
| JP | 06-053272 | 7/1994 | |
| JP | 2007-296910 | 11/2007 | |

(Continued)

OTHER PUBLICATIONS

Japanese Official Action for JP2011-170841 dated Dec. 24, 2014, along with an English-language translation thereof.

*Primary Examiner* — David R Dunn
*Assistant Examiner* — Tania Abraham
(74) *Attorney, Agent, or Firm* — Greenblum Bernstein, P.L.C.

(57) ABSTRACT

A vehicle seat includes a seat cushion, a seatback, an upholstery member that covers a surface of the seatback, and a striker. The striker is fitted to a frame body that forms the seatback, and is engaged with a lock mechanism arranged outside the seatback. The striker has an engagement portion that is locked by the lock mechanism, and a threaded shaft portion that has an external thread that is screwed to the frame body. The threaded shaft portion of the striker is fastened to the frame body through a through-hole formed in the upholstery member, with the frame body covered with the upholstery member of the seatback.

12 Claims, 6 Drawing Sheets

(56) References Cited

FOREIGN PATENT DOCUMENTS

| | | |
|---|---|---|
| JP | 2008-308094 | 12/2008 |
| JP | 2010-163835 | 7/2010 |
| JP | 2011-110962 | 6/2011 |

* cited by examiner

VEHICLE SEAT

INCORPORATION BY REFERENCE

The disclosure of Japanese Patent Application No. 2011-170841 filed on Aug. 4, 2011 including the specification, drawings and abstract is incorporated herein by reference in its entirety.

BACKGROUND OF THE INVENTION

1. Field of the Invention

The invention relates to a vehicle seat. More specifically, the invention relates to a vehicle seat in which a striker that is a rod member and that is engaged with a lock mechanism arranged outside a seatback is securely fitted to a frame body of the seatback.

2. Description of Related Art

In a vehicle rear seat according to related art, a seatback is locked by lock mechanisms that are arranged at vehicle body wall portions located on the right and left sides of the seatback, and the backrest angle of the seatback is fixed (refer to Japanese Patent Application Publication No. 2011-110962 (JP 2011-110962 A)). More specifically, strikers that are rod members and that are engageable with the lock mechanisms are coupled to right and left side portions of the seatback, and the strikers are inserted in and locked by the lock mechanisms. The strikers are fixed to a framework of the seatback by welding.

In the related art described in JP 2011-110962 A, the strikers are welded in advance to the framework of the seatback. Therefore, it is necessary to set up a configuration that makes it possible to fit an upholstery member over the framework while avoiding the strikers. This complicates the structure of the seatback.

SUMMARY OF THE INVENTION

The invention provides a vehicle seat in which a striker is easily fitted to a framework of a seatback after the framework is covered with an upholstery member.

A vehicle seat according to an aspect of the invention includes a seat cushion, a seatback, an upholstery member that covers a surface of the seatback, and a striker that is a rod member. The striker is fitted to a frame body that forms the seatback, and is engaged with a lock mechanism arranged outside the seatback. The striker has an engagement portion that is locked by the lock mechanism, and a threaded shaft portion that has an external thread that is screwed to the frame body. The threaded shaft portion of the striker is fastened to the frame body through a through-hole formed in the upholstery member, with the frame body covered with the upholstery member of the seatback. In this way, the striker is securely fitted to the frame body.

According to the aspect described above, the striker has the threaded shaft portion, and the through-hole is formed in the upholstery member so that the threaded shaft portion is passed through the through-hole. With this configuration, after the frame body is covered with the upholstery member, the striker is easily fitted to the frame body.

In the aspect described above, the threaded shaft portion may be coaxial with the engagement portion and may be formed at one end portion of the striker, and a fitting head portion that is engaged with a tightening tool for screwing the threaded shaft portion to the frame body may be formed at the other end portion of the striker.

With this configuration, the threaded shaft portion and the fitting head portion are formed at the respective end portions of the striker. Therefore, it is possible to further easily fit the striker to the frame body that has been already covered with the upholstery member.

In addition, in the configuration described above, the fitting head portion may be shaped such that a hex lobe wrench is engaged with the fitting head portion.

Because the fitting head portion is a specially-shaped portion that is engaged with the hex lobe wrench, it is not possible to remove the striker with the use of a commonly-used wrench such as a hexagon wrench. Therefore, it is possible to prevent a user from erroneously removing and losing the striker.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereafter, an embodiment of the invention will be described with reference to the accompanying drawings.

Figure 1:
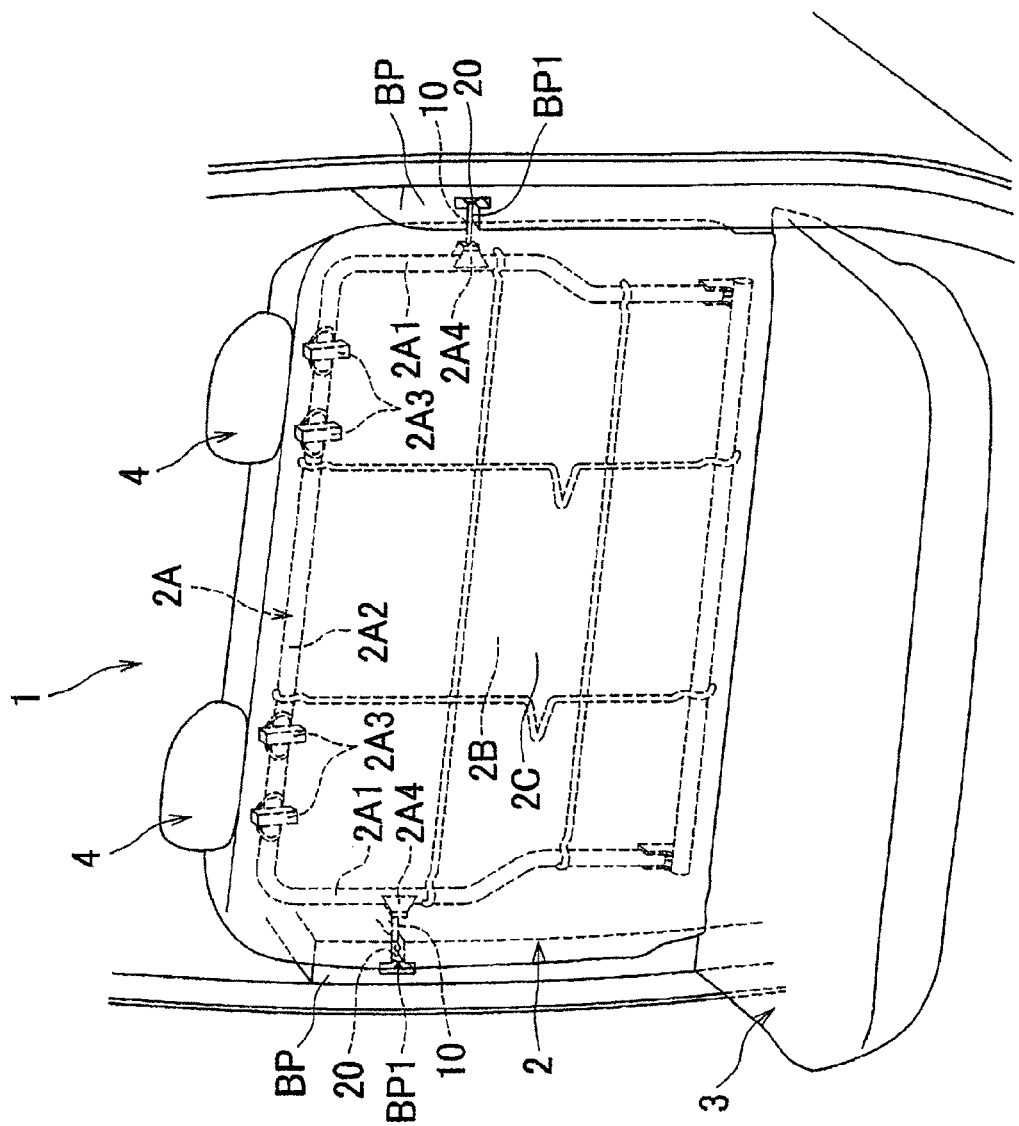
FIG. 1 is a perspective view schematically showing a vehicle seat.

First, the configuration of a vehicle seat 1 according to an embodiment of the invention will be described with reference to FIG. 1 to FIG. 7. As shown in FIG. 1, the vehicle seat 1 according to the present embodiment is configured as a rearmost vehicle seat for three occupants. The vehicle seat 1 includes a seatback 2 used as a backrest for seated occupants, a seat cushion 3 used as a seating portion, and headrests 4, 4 that support the heads of the seated occupants.

Figure 2:
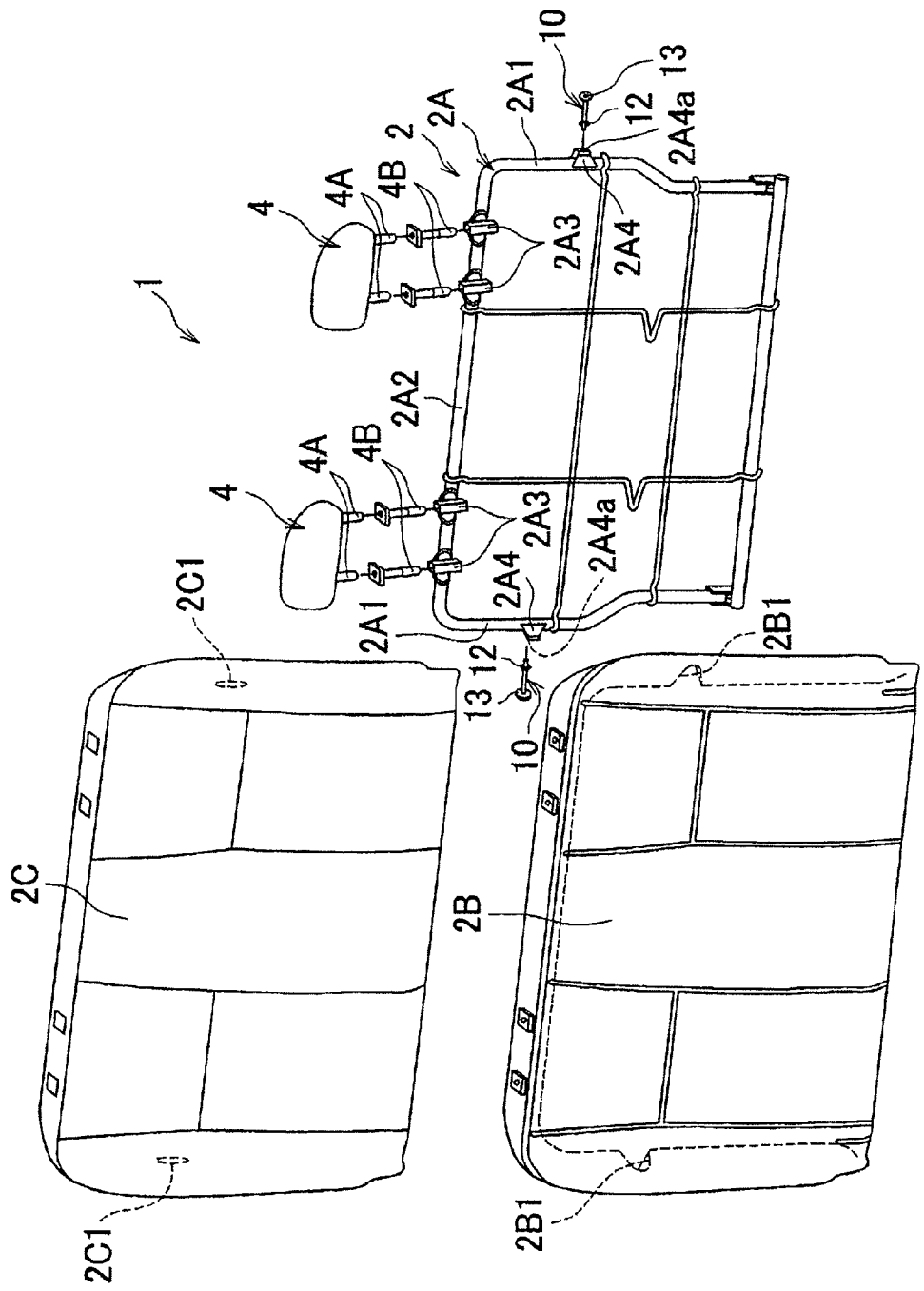
FIG. 2 is an exploded perspective view of a seatback.

As shown in FIG. 1 and FIG. 2, a framework arranged inside the seatback 2 is formed of a seatback frame 2A that is formed in a rectangular frame shape and made of steel pipes (round pipes). A cushion pad 2B is fitted to a front-side portion of the seatback frame 2A so as to cover frame peripheral portions of the seatback frame 2A from the outer peripheral side. The cushion pad 2B is formed by subjecting urethane resin to foam molding. An upholstery member 2C made of fabric is fitted onto the surfaces of the cushion pad 2B such that the outer faces of the seatback 2 are entirely covered with the upholstery member 2C. Note that the seatback frame 2A may function as "frame body" according to the invention.

Specifically, the seatback frame 2A is formed in a rectangular frame shape by connecting a straight steel pipe to both lower ends of a steel pipe bent into an inverted U-shape. A pair of holders 2A3, 2A3, which are in a quadrangular prism shape and arranged side-by-side in the seat-width direction, is welded to each of right and left two portions of a front-side portion of an upper frame 2A2 that forms the upper frame peripheral portion of the seatback frame 2A. Two headrests 4, 4 are arranged above the seatback 2. Each pair of holders 2A3, 2A3 holds support members 4B, 4B to which stays 4A, 4A of a corresponding one of the two headrests 4 are fitted.

In addition, strikers 10, 10, which are rod members, are securely fitted to respective side frames 2A1, 2A1, which form the right and left frame peripheral portions of the seatback frame 2A, so as to extend straight outward in the seat-width direction from the side frames 2A1, 2A1. As shown in FIG. 1, the strikers 10, 10 are engaged with and locked by lock mechanisms 20, 20 that are arranged at vehicle body wall portions located on the right and left outer sides of the seatback 2. When the strikers 10, 10 are locked by the lock mechanisms 20, 20 on the right and left sides of the seatback 2, the seatback 2 is secured to the vehicle body wall portions on the right and left sides of the seatback 2 and the backrest angle of the seatback 2 is fixed.

The strikers 10, 10 described above are screwed to respective brackets 2A4, 2A4, which are integrally welded to the side frames 2A1, 2A1 of the seatback frame 2A, from the outside in the seat-width direction. Specifically, after the seatback frame 2A described above is covered with the cushion pad 2B and the upholstery member 2C, the strikers 10, 10 are passed through through-holes 2C1, 2C1 formed in the upholstery member 2C, and then fixedly screwed to the brackets 2A4, 2A4 of the seatback frame 2A from the outside of the upholstery member 2C with the use of a tightening tool (hex lobe wrench (not shown)).

The through-holes 2C1, 2C1 are formed in the upholstery member 2C at portions that cover the brackets 2A4, 2A4. In addition, cavities 2B1, 2B1 are formed in the cushion pad 2B arranged inside the upholstery member 2C, at portions that cover the side frames 2A1, 2A1. The cavities 2B1, 2B1 are formed by removing the pad material from regions of the cushion pad 2B, where the brackets 2A4, 2A4 are arranged. As a result, the brackets 2A4, 2A4 arranged in the regions are not covered with the cushion pad 2B. That is, when the seatback frame 2A is covered with the cushion pad 2B and the upholstery member 2C, through-holes 2A4a, 2A4a of the brackets 2A4, 2A4 are exposed to the outside of the seatback 2 through the cavities 2B1, 2B1 of the cushion pad 2B and the through-holes 2C1, 2C1 of the upholstery member 2C. With this configuration, it is possible to easily insert the strikers 10, 10 into the through-holes 2A4a, 2A4a of the brackets 2A4, 2A4 straight from the outside in the seat width direction through the through-holes 2C1, 2C1 of the upholstery member 2C, and to tightly screw the strikers 10, 10 to the brackets 2A4, 2A4.

Figure 3:
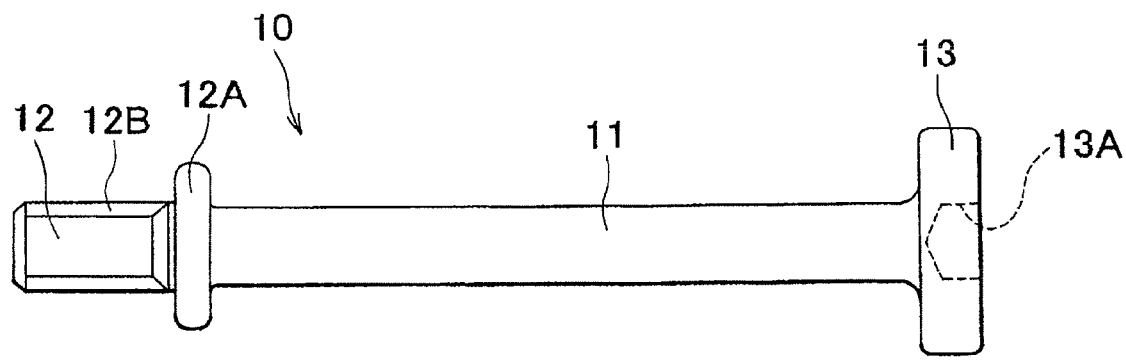
FIG. 3 is a front view showing the shape of a striker.
Figure 4:
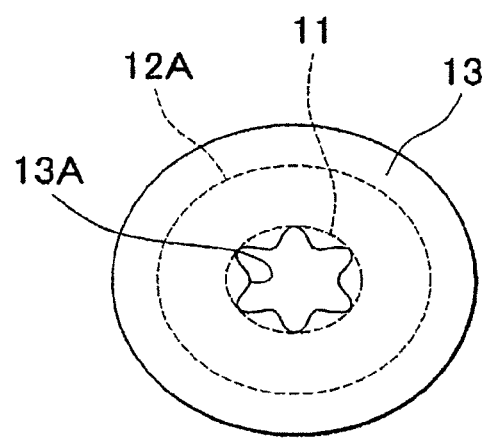
FIG. 4 is a side view showing the shape of a fitting head portion of the striker.

Hereafter, the configurations of the strikers 10, 10 and the lock mechanisms 20, 20 will be described in detail. Because two combinations each including one striker 10 and one lock mechanism 20 have the same configuration, the configuration of one of the combinations will be described below as a representative example with reference to FIG. 3 to FIG. 7. As shown in FIG. 3, the striker 10 is a straight round rod, and has a threaded shaft portion 12 having an external thread 12B on its outer periphery. The threaded shaft portion 12 is formed in the striker 10 at its one end portion in the direction in which the round rod extends (hereinafter, referred to as "axial direction"). A fitting head portion 13 that has a hex lobe hole 13A (see FIG. 4) in a special shape, into which a tightening tool (hex lobe wrench (not shown)) is fitted, is formed in the striker 10 at the other end portion in the axial direction of the striker 10. In addition, a rod portion of the striker 10 between the threaded shaft portion 12 and the fitting head portion 13 is used as an engagement portion 11 that is locked by the lock mechanism 20 described later (see FIG. 5 to FIG. 7).

A flange 12A, which functions as a head portion of the threaded shaft portion 12, is formed at the boundary between the threaded shaft portion 12 and the engagement portion 11. When the external thread 12B of the threaded shaft portion 12 is inserted into the through-hole 2A4a to be screwed to an internal thread formed in the bracket 2A4 (see FIG. 1) of the seatback frame 2A, the flange 12A contacts a flange seating face of the bracket 2A4 to restrict the tightened position of the threaded shaft portion 12. In addition, the fitting head portion 13 is also formed as a flange having a disc shape, which extends radially outward from the engagement portion 11. The above-described hex lobe hole 13A is formed at the center portion (axial center portion) of the fitting head portion 13. The center of the hex lobe hole 13A, the axis of the engagement portion 11, and the axis of the threaded shaft portion 12 are aligned on the same axis.

Figure 5:
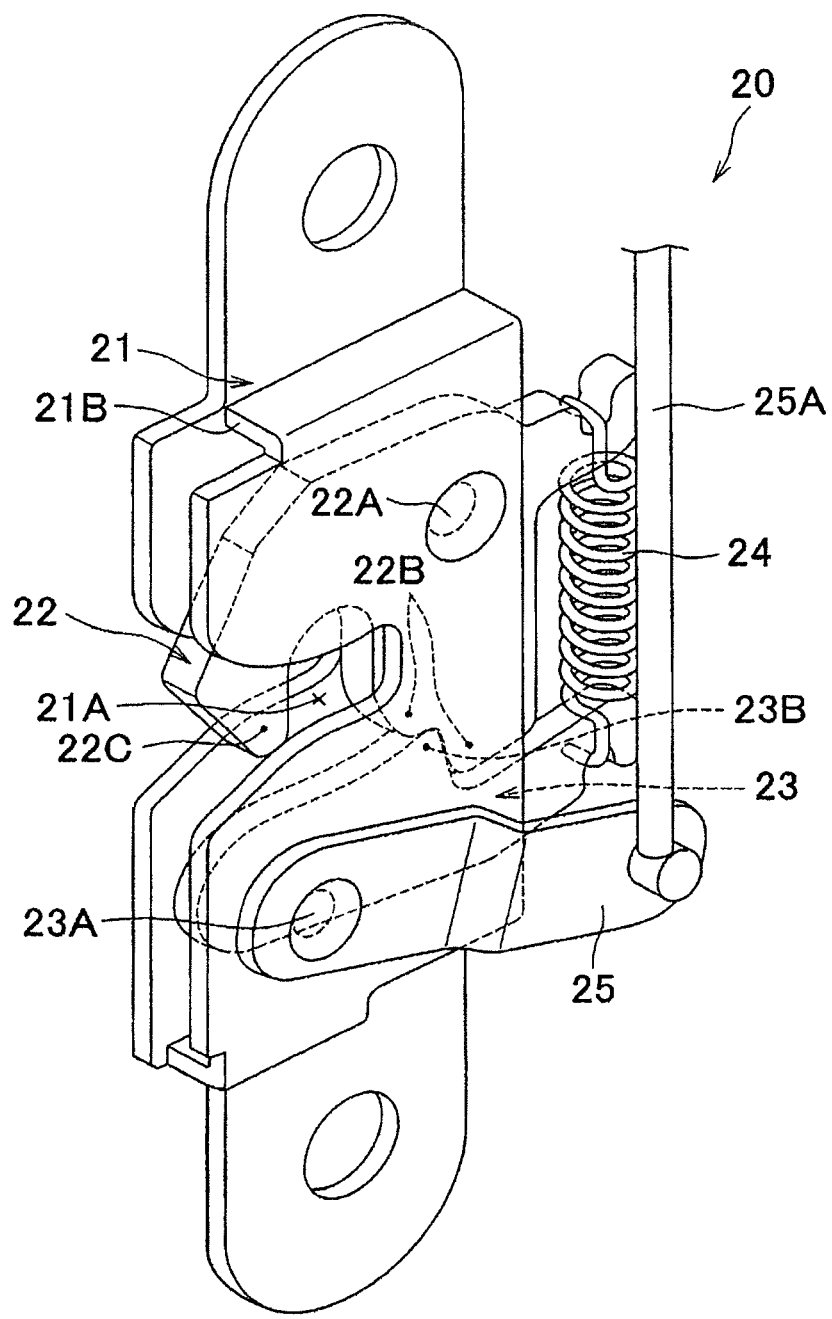
FIG. 5 is a perspective view showing the structure for engaging the striker with a lock mechanism.
Figure 6:
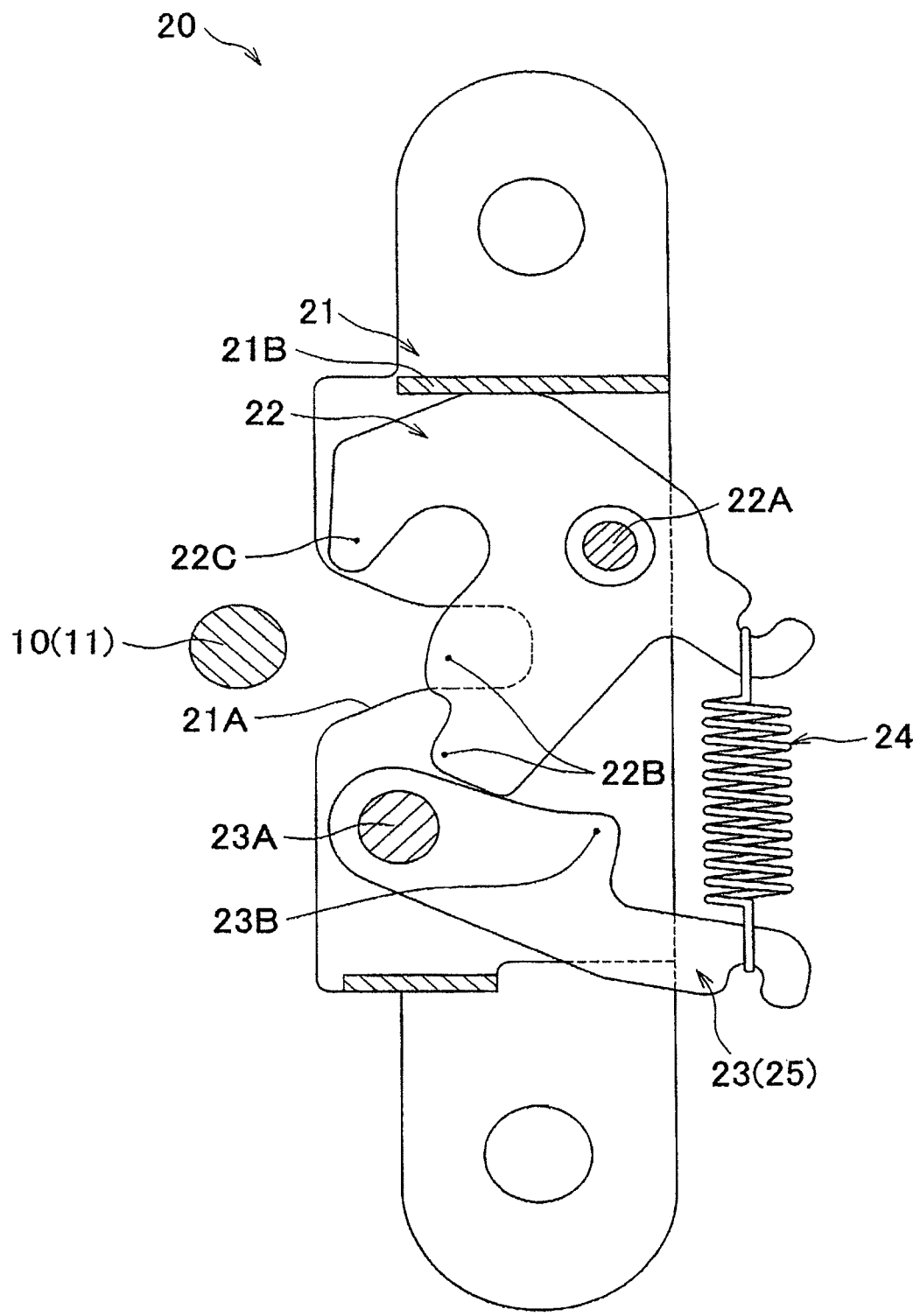
FIG. 6 is an internal sectional view showing the state where the striker has not been locked by the lock mechanism.
Figure 7:
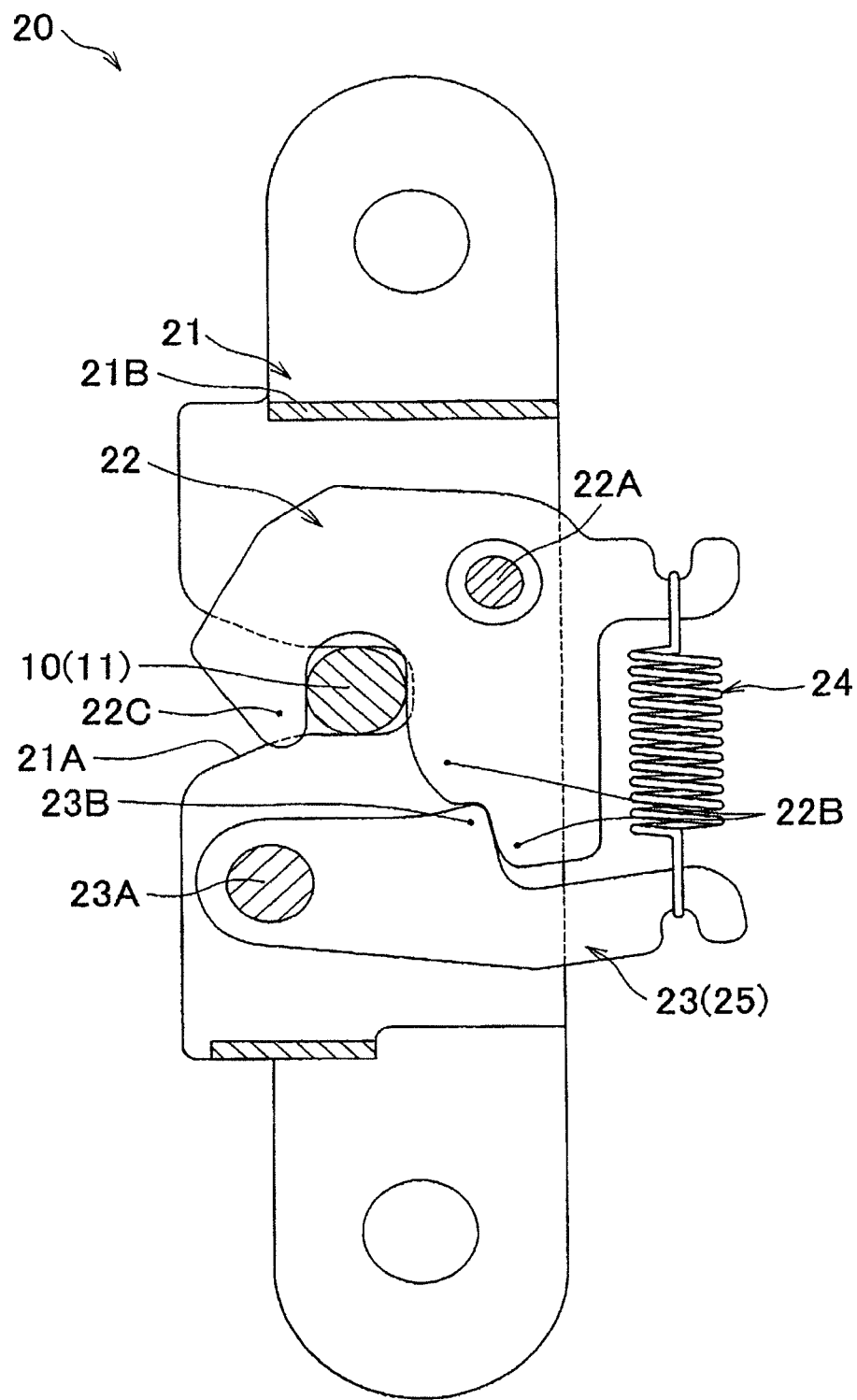
FIG. 7 is an internal sectional view showing the state where the striker has been locked by the lock mechanism.

Next, the configuration of the lock mechanism 20 will be described. As shown in FIG. 5 to FIG. 7, the lock mechanism 20 includes a base plate 21, a hook 22, a pawl 23, a tension spring 24, and an operating arm 25. The base plate 21 is securely fixed to the vehicle body wall portion, and has a recess 21A into which the striker 10 is fitted from ahead of the base plate 21 in the vehicle longitudinal direction. The hook 22 is supported by the base plate 21 via a first connecting shaft 22A so as to be pivotable about the first connecting shaft 22A with respect to the base plate 21. The pawl 23, together with the operating arm 25, is supported by the base plate 21 via a second connecting shaft 23A so as to be pivotable about the second connecting shaft 23A with respect to the base plate 21. The tension spring 24 is hooked on the hook 22 and the pawl 23 so as to extend therebetween, and applies urging force to the hook 22 and the pawl 23 in such directions that a hooking portion of the hook 22 and a hooking portion of the pawl 23 approach each other.

As shown in FIG. 6, at normal times, the hook 22 is urged so as to pivot clockwise (as viewed in the drawings) by the tension spring 24, and the hook 22 is held in a position (initial position) in which the hook 22 contacts a locking plate portion 21B of the base plate 21 and locked by the locking plate portion 21B. In the initial state, a first arm 22B that extends from a main body of the hook 22 projects into the recess 21A of the base plate 21. At this time, the pawl 23 is urged so as to pivot counterclockwise (as viewed in the drawings) by the urging force of the tension spring 24, and the pawl 23 is in contact with and locked by the first arm 22B of the hook 22.

As the striker 10 is pushed into the recess 21A of the base plate 21, the first arm 22B of the hook 22 is pushed rearward (toward the right side in the drawings) by the striker 10 to be pivoted. At the same time, a second arm 22C, which is another arm of the hook 22, closes the recess 21A by coming around behind the striker 10 (coming to the left side of the striker 10 in FIG. 7) (see FIG. 7). As well as the first arm 22B, the second arm 22C extends from the main body of the hook 22. In addition, when the hook 22 is in such a pivot position that the second arm 22C closes the recess 21A, the pawl 23 is pivoted by the urging force of the tension spring 24 such that a corner portion 23B, which is part of the pawl 23 and projects from the other part of the pawl 23, is engaged with a step portion of the first arm 22B of the hook 22. As a result, the hook 22 is prevented from pivoting clockwise (as viewed in the drawings) toward its original position (a locked state is achieved). In this way, the striker 10 is held to be restrained in a space within the recess 21A that is closed by the second arm 22C of the hook 22 (the locked state is maintained).

The locked state of the hook 22 is cancelled by pushing the operating arm 25, which pivots together with the pawl 23, downward (as viewed in the drawings) via a wire 25A upon an operation of a push bottom (not shown) arranged on the vehicle body wall portion. Specifically, when the operating arm 25 is pushed downward to be pivoted clockwise (as viewed in the drawings), the corner portion 23B of the pawl 23 is disengaged from the first arm 22B of the hook 22 (the state where the corner portion 23B is engaged with the step portion is cancelled), and the hook 22 is allowed to be pivoted toward its original position. In this way, as shown in FIG. 6, the hook 22 is pivoted clockwise (as viewed in the drawings) by the urging force of the tension spring 24 so as to push the striker 10 out of the recess 21A, and the locked state of the striker 10 is cancelled. In addition, as shown in FIG. 1, the lock mechanisms 20, 20 are covered with resin interior panels BP, BP that cover the vehicle body wall portions. The strikers 10, 10 are inserted into the recesses 21A, 21A from ahead of the lock mechanisms 20, 20 in the vehicle longitudinal direction and removed out of the recesses 21A, 21A through slits BP1, BP1 formed in the interior panels BP, BR As described above, the vehicle seat 1 according to the present embodiment has the simple configuration in which the threaded shaft portions 12, 12 are formed in the strikers 10, 10 and the through-holes 2C1, 2C1 are formed in the upholstery member 2C so that the threaded shaft portions 12, 12 are passed through the through-holes 2C1, 2C1. Accordingly, after the seatback frame 2A is covered with the upholstery member 2C, the strikers 10, 10 are easily fitted to the seatback frame 2A from the outside of the seat. In addition, the threaded shaft portion 12 and the fitting head 15. portion 13 are formed at the respective end portions of each striker 10. Therefore, the strikers 10, 10 are easily fitted to the seatback frame 2A that has been already covered with the upholstery member 2C. In addition, because the fitting head portion 13 of each striker 10 has a specially-shaped fitting hole (hex lobe hole 13A) into which the hex lobe wrench is fitted, it is not possible to remove the striker 10 with the use of a commonly-used wrench such as a hexagon wrench. Therefore, it is possible to prevent a user from erroneously removing and losing the striker 10.

While the example embodiment of the invention has been described above, the invention may be implemented in various other embodiments. For example, in the above-described embodiment, the hex lobe holes 13A, 13A are formed in the fitting head portions 13, 13 of the strikers 10, 10, and the hex lobe wrench is fitted in the hex lobe holes 13A, 13A to tighten the strikers 10, 10. Alternatively, a hole formed in the fitting head portion may be a regular hexagonal hole into which a hexagon wrench is fitted. Further alternatively, a projection that is shaped to be fitted in a hex lobe or hexagon hole may be formed in the fitting head portion, and a hole corresponding to the shape of the projection may be formed in the wrench. In addition, the portions of the frame body of the seatback, to which the strikers are fitted, are not limited to the side portions of the frame body, and may be any portions of the frame body, including upper portions and lower portions. In addition, the situation where the lock mechanisms are arranged "outside the seatback" may include the following situation. For example, when the seatback is divided into two or more seatbacks, the striker is arranged in one of the adjacent seatbacks and the lock mechanism with which the striker is engaged is arranged at the other one of the adjacent seatbacks.

What is claimed is:
1. A vehicle seat, comprising:
 a seat cushion;
 a seatback;
 an upholstery member that covers a surface of the seatback; and
 a striker that is a rod member, that is fitted to a frame body defining the seatback, and that is engageable with a lock mechanism arranged outside the seatback,
 the lock mechanism including:
  a base plate that is securely fixed to a vehicle body wall portion;
  a hook pivotally supported by the base plate;
  a pawl pivotally supported by the base plate and engageable with the hook:
  a tension spring connected with the hook and the pawl so as to extend therebetween; and
  an operating arm engaged with the pawl to lock and unlock the lock mechanism such that when the lock mechanism is in an unlocked state, the hook is pivotally biased in a clockwise direction and contacts a locking plate of the base plate, and the pawl is pivotally biased in a counterclockwise position and contacts a first arm of the hook, wherein
 the striker has an engagement portion that is locked by the lock mechanism, and a threaded shaft portion that has an external thread that is configured to be screw-fitted to the frame body, and
 the threaded shaft portion of the striker is fastened to the frame body through a through-hole provided in the upholstery member, with the frame body covered with the upholstery member of the seatback.
2. The vehicle seat according to claim 1, wherein
the frame body is provided with a bracket, and
the striker is screw-fitted to the bracket.
3. The vehicle seat according to claim 2, wherein
a flange is provided at a boundary between the threaded shaft portion and the engagement portion.
4. The vehicle seat according to claim 1, wherein
the threaded shaft portion is coaxial with the engagement portion, and is provided at one end portion of the striker, and
a fitting head portion that is engageable with a tightening tool for screw-fitting the threaded shaft portion to the frame body is provided at the other end portion of the striker.
5. The vehicle seat according to claim 4, wherein
the fitting head portion is shaped such that a hex lobe wrench is engageable with the fitting head portion.
6. The vehicle seat according to claim 1, wherein
the base plate is provided with a recess into which the striker is fitted.
7. The vehicle seat according to claim 1, wherein
the hook is supported by the base plate via a first connecting shaft so as to be pivotable about the first connecting shaft with respect to the base plate.
8. The vehicle seat according to claim 1, wherein
the pawl and the operating arm are supported by the base plate via a second connecting shaft so as to be pivotable about the second connecting shaft with respect to the base plate.
9. The vehicle seat according to claim 1, wherein
the tension spring applies an urging force to the hook and the pawl thereby allowing a hooking portion of the hook and a hooking portion of the pawl to approach each other.
10. The vehicle seat according to claim 1, wherein
when the lock mechanism is in a locked state, the hook is pivotally urged in the counterclockwise direction so as to lock the striker within a recess of the base plate, and the pawl is pivotally urged in the clockwise direction to engage a first arm of the hook and prevent the hook from pivoting back in the clockwise direction.

11. The vehicle seat according to claim 10, wherein
when the operation member is actuated downward, the pawl is pivoted clockwise, the hook is pivoted clockwise, and the lock mechanism is released from the locked state.

12. The vehicle seat according to claim 1, wherein
the striker is fitted to the frame body in a seat width direction.

* * * * *